Figure 1:
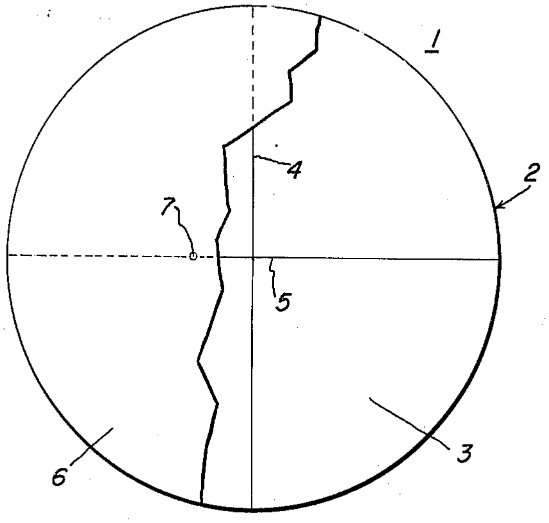

Feb. 1, 1966 W. C. DASH 3,232,799
METHOD OF DETERMINING THE THICKNESS OF EPITAXIALLY
DEPOSITED LAYERS OF MATERIAL
Filed Aug. 2, 1962

Inventor:
William C. Dash,
by Joseph V. Claeys
His Attorney.

United States Patent Office 3,232,799

Patented Feb. 1, 1966

3,232,799

METHOD OF DETERMINING THE THICKNESS OF EPITAXIALLY DEPOSITED LAYERS OF MATERIAL

William C. Dash, Ballston Lake, N.Y., assignor to General Electric Company, a corporation of New York Filed Aug. 2, 1962, Ser. No. 214,401
6 Claims. (Cl. 148—175)

This invention relates generally to a method of determining the thickness of deposited layers of materials and more particularly to a new and improved method of accurately and nondestructively determining the thickness of epitaxially deposited layers of materials which form stacking faults in only one set of equivalent crystallographic planes.

While this invention is subject to a wide range of applications, it is especially suited for use in determining the thickness of epitaxially deposited layers of semiconductive materails such as germanium, silicon and the like, and will be particularly described in that connection.

In the present state of the semiconductor device art the most commonly used semiconductive materials for making such semiconductor devices as diodes, rectifiers, transistors and the like, are germanium and silicon. The III–V semiconductive compounds, however, are becoming more and more important and more widely used for making certain semiconductor devices, such as for example, tunnel diodes.

Among the important processes used in the production of such semiconductor devices is the epitaxial deposition of these semiconductive materials on a suitable monocrystalline substratum from a vapor compound of the semiconductive material. The epitaxial deposition process is advantageously employed in making many kinds of devices as well as in making devices not capable of being made in any other way.

The epitaxial deposition of the elemental semiconductive materials, such as germanium and silicon, is a process well-known in the art. One such process, for example, is disclosed in United States patent, No. 2,692,839, Christensen and Teal. A process for epitaxially depositing compound semiconductive materials, such as those known as the III–V group, is disclosed and claimed in the copending application of Nick Holonyak, Jr., Serial No. 134,903, filed August 30, 1961, now abandoned, in favor of continuation-in-part application, Serial No. 457,754, filed May 21, 1965, and assigned to the assignee of the present invention.

An important consideration in the production of semiconductor devices by the epitaxial deposition process is the thickness of the deposited layer. Methods have been devised in the prior art for determining the thickness of such deposited layers. It has been suggested, for example, that test samples be selected from each "run" of the process and the material deposited on such test samples appropriately sectioned and the thickness thereof measured microscopically. Such a method provides a relatively accurate measurement of the thickness of the layer of material deposited on that sample, but is only an approximate representation of the average thickness of the deposited material on the other substrates of that run. It has also been suggested that the epitaxial deposition process be very carefully controlled so that the thickness of the deposited material on the substrates may be determined by weight analysis. These methods are somewhat difficult to carry out and are completely incapable of accurately determining the thickness of the deposited material across the entire surface of each and every substrate. The desirability of providing a nondestructive method of accurately determining the thickness of epitaxially deposited layers of material over the entire substrate surface, therefore, is recognized.

It is an object of this invention, therefore, to provide a method of measuring the thickness of epitaxially deposited layers of material which substantially overcomes one or more of the limitations and disadvantages of the prior art and which is nondestructive.

It is another object of this invention to provide a nondestructive method for quickly, accurately and efficiently determining the thickness of epitaxially deposited layers of material over the entire surface of a substrate.

Briefly stated, in accordance with one aspect of this inevntion, I provide a nondestructive method of determining the thickness of epitaxially deposited layers of materials which form stacking faults in only one set of equivalent crystallographic planes by causing the formation of stacking faults in the epitaxially deposited layer which have their origin at the surface of the substrate, measuring the length of the line of intersection of the stacking faults on the surface of the deposited layer and utilizing the characteristic relationship between the length of the line of intersection of the stacking fault on the surface of the layer to the distance to its origin to determine the thickness of the deposited layer.

Figure 2:
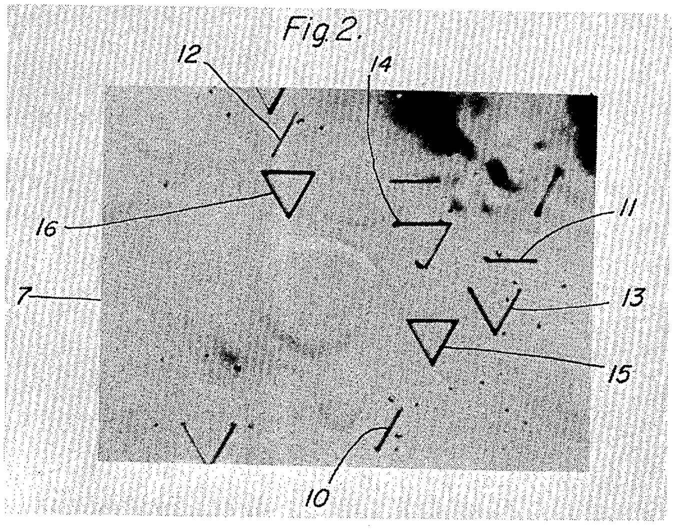

The novel features believed characteristic of this invention are set forth with particularity in the appended claims. The invention itself, however, both as to its organization and method of operation, together with further objects and advantages thereof, may best be understood by reference to the following description taken in conjunction with the accompanying drawing in which:

FIGURE 1 is an enlarged view partly broken away to illustrate both the surface of the substrate and the surface of the layer of material epitaxially deposited thereon; and FIGURE 2 is a photomicrograph of a portion of the etched surface of the epitaxially deposited layer of material illustrating the appearance of the lines of intersection of the stacking faults with the surface nucleated by a portion of the line 5 of FIGURE 1.

For clarity and simplicity of explanation the following detailed description of the invention will be with particular reference to the determination of the thickness of an epitaxially deposited layer of silicon on a substrate of (111) orientation. It is to be understood, however, that the principles of this invention are applicable with substrates of different crystallographic orientation and with other materials so long as such materials form stacking faults in only one set of equivalent crystallographic planes, for example, {111}, {110} or the like.

In FIGURE 1 there is shown an enlarged view of a substrate, generally designated at 1, upon which a layer of material which forms stacking faults in only one set of equivalent crystallographic planes is to be epitaxially deposited. A typical substrate, for example, may be a disc 2 cut from a single crystal of N-type silicon and may be about 0.8 to 1.0 inch in diameter, about 0.015 inch thick and having a (111) orientation.

The layer of material to be epitaxially deposited on disc 2 may be for example P-type silicon. Alternatively, as well-known in the art, the deposited layer may be of material different from that of the substrate. Moreover, the deposited layer may be mixed crystal such as gallium arseno phosphide ($GaAs_xP_{1-x}$) or the like as disclosed in the above referenced copending application, Serial No. 134,903.

Disc 2 is suitably prepared, such as by etching, lapping, polishing or a combination thereof, to provide at least one surface 3 which is fresh, clean and crystallographically undisturbed. Such preparation of the surface of the substrate as well as the epitaxial deposition of the layer of material thereon is well-known in the art and forms no part of the present invention.

In accordance with this invention at least one region of the surface 3 upon which the layer of material is to be deposited is treated to cause nucleation thereat of stacking faults in the epitaxial layer. Such stacking faults may be nucleated at the surface 3 by depositing at the selected region particles of a material which is nonreacting with either the material of the substrate or the layer to be deposited thereon. The nonreactive particles so deposited should be small compared to the desired thickness of the deposited layer. Preferably, such particles should be less than 1000 A. in size and may be of such materials. for example, as silicon carbide, quartz or the material of either the substrate or the deposited layer. Alternatively, such nucleation of stacking faults in the epitaxially deposited layer may be provided by making a scratch in the surface 3 at the selected region or regions as well as by various other types of surface imperfections.

To assure a determination of the thickness of the deposited layer over the entire surface of the substrate it is convenient to cause nucleation of the stacking faults across two diameters of the surface 3 such as represented by the lines 4 and 5. Lines 4 and 5 for example, may be scratched into the surface or suitable nonreactive particles may be deposited in a similar configuration thereon. Alternatively, small regions may be similarly treated at various places on the surface 3 such as at the center and other selected portions so that the thickness of the deposited layer may be determined across the entire surface of disc 2.

After treating the surface of the substrate in the foregoing described manner, or in any other manner capable of nucleating stacking faults thereat in the epitaxially deposited layer, the substrate is utilized in conventional manner and the selected layer of material deposited thereon in accordance with known prior art methods of epitaxially depositing such layers.

For example, the substrate of semiconductive material of a given conductivity type and crystallographic orientation may be mounted in a chamber together with a quantity of iodine and a mass of the semiconductive material of opposite conductivity type. A flow of hydrogen is then produced which passes over the iodine, the semiconductive mass and the substrate in succession and the iodine heated to vaporizing temperature. An elevated temperature is maintained in the vicinity of the mass and the substrate to decompose the vapor resulting in the deposition of a layer 6 of the opposite conductivity type semiconductive material on the substrate.

In materials such as germanium, silicon and the III–V compounds, which form stacking faults in only one set of equivalent crystallographic planes, the stacking faults are of relatively simple triangular configuration and are characteristic of the crystallographic orientation of the substrate. For example, for a substrate having a (111) orientation the characteristic stacking faults nucleated in the deposited layer are equilateral triangles with all sides parallel to <110> directions. The lines of intersection of such stacking faults are visible on the surface of the epitaxially deposited layer 6 and may be made more distinct by a light etch thereof.

I have found that the apex of such a stacking fault is at the origin thereof and that there is accurate correlation between the length of the line of intersection of the stacking fault on the surface of the epitaxially deposited layer and the layer thickness. I have further found that the characteristic relationship between the length of the line of intersection of the stacking fault measured on the surface of the deposited layer to the distance to the origin of the stacking fault may be utilized to determine the thickness of the deposited layer when such stacking faults have been nucleated at the surface of the substrate.

Thus, for a substrate having a (111) orientation the distance $d$ from the base to the apex of such an equilateral triangular stacking fault formed in the epitaxially deposited layer is given by the characteristic relationship for that orientation.

Thus, $$d=\sqrt{2/3}l=0.816l$$

where $l$ is the length of the line of intersection of the stacking fault measured on the surface of the deposited layer. Since the stacking faults have been nucleated at the surface of the substrate the apex thereof is at the substrate surface so that the distance from the observed line of intersection of the stacking fault on the surface of the deposited layer provides a quick, accurate, non-destructive and efficient determination of the layer thickness.

For substrate orientation other than (111) the stacking faults will not generally be of equilateral triangular configuration so that in those instances the foregoing relationship will not apply. Knowing the substrate orientation and the crystallographic direction of the stacking fault formed in the deposited layer, however, the thickness of the layer of deposited material may be determined in similar manner from the similar characteristic relation.

For example, for the (100) plane the lines of intersection of the stacking faults appear as squares or sides thereof and the thickness of the layer is determined as, $$d=\frac{l}{\sqrt{2}}$$

For the (110) plane the lines of intersection appear as triangles or one or more sides thereof, these triangles have one long side and two shorter sides of equal length. The thickness of the deposited layer for such plane is determined from the characteristic relationship as before. Thus, $$d=\frac{l(a\text{ or }b)}{\sqrt{3}}$$

or, $$d=\frac{l(c)}{2}$$

where $a$ and $b$ designate the two equal shorter lines of intersection of the stacking faults and $c$ the longer line.

The above examples are given in order to more clearly illustrate that the thickness of the deposited layer may be determined from the characteristic relationship of the lines of intersection of the stacking faults which were formed on the substrate surface of given crystallographic orientation.

The nature of the lines of intersection of the stacking faults with the surface of the eptiaxially deposited layer may best be shown by the photomicrograph of the portion of the surface shown in FIGURE 2. The portion of the surface of the deposited layer 6 shown in FIGURE 2 corresponds to the circled portion 7 of the treated region shown in FIGURE 1. The stacking faults nucleated by the line 5 are randomly distributed within the region defined thereby. Thus, in FIGURE 2, which shows a portion of the width of line 5, the lines of intersection of the stacking faults which appear distinctly on the surface of the deposited layer have such a random distribution.

The nucleated stacking faults may be of either single or multiple triangular configuration having their apex at the treated region of the substrate. The lines of intersection of the single stacking faults appear on the surface of the epitaxially deposited layer as single lines such as those designated by the reference numerals 10, 11 and 12 while the lines of intersection of the multiple stacking faults may appear in the form shown at 13 and 14 or as trigons such as those shown at 15 and 16 or combinations of these three simple configurations.

Since the majority of the lines of intersection of the stacking faults appearing at the surface of the deposited layer in the treated region of the substrate will have been nucleated, or originated, at the substrate surface, these lines of intersection of the stacking faults will all have substantially the same length and may very easily be distinguished from the smaller sized, spurious, stacking faults which do not originate at the substrate surface. For purposes of this invention, therefore, only the length of the largest stacking fault intersections is utilized in determining the thickness of the deposited layer since only these faults will have originated at the substrate surface. The thicker the deposited layer, the longer will be the line of intersection of the stacking fault with the surface thereof.

The invention has been set forth in detail hereinbefore, however, the following specific examples are given as a further aid in the understanding thereof. Such examples are exemplary only and are not intended as limiting this invention.

*Example I*

A disc about 1.0 inch in diameter and about 0.015 inch thick is cut from a single crystal of N-type silicon having, within 1°, a (111) crystallographic orientation. The disc is prepared for the epitaxial deposition thereon of a layer of selected material by first lapping both sides with about 600 mesh carborundum to remove any saw-cut damage therefrom. About .002 inch is removed from each side in this manner after which the disc is washed thoroughly in water. Another .001 inch of material is removed from both sides of the disc by lapping thereof with #304 emery and again the disc is thoroughly washed in water. Greases and any other hydrocarbons are then removed by heating the disc for about 1 minute in a hot chromic acid cleaning solution and thereafter washing thoroughly in deionized water. Remaining residual surface damage is removed by etching the disc for about 5 minutes in an agitated solution consisting of 1 part HF, 3 parts $HNO_3$ and 6 parts glacial acetic acid, all of concentrated reagent grade. The disc is thereafter rinsed in deionized water. Final preparation of the disc consists of providing a smooth, bright surface by chemically polishing the disc for about 2 minutes in a solution consisting of 1 part HF and 3 Parts $HNO_3$ (concentrated reagent grade) after which the disc is dried in a jet of nitrogen.

In accordance with this invention the surface of the disc upon which the epitaxial layer is to be deposited is brought into contact with a taut fine nylon thread about 0.003 inch in diameter which has been dipped into a suspension of finely powdered silicon carbide in water. The thread is first touched to the surface of the disc across one diameter and then similarly touched thereto across the perpendicular diameter. Particles of silicon carbide are thus deposited on, and remain in contact with, the surface of the disc along the lines of contact with the thread such as shown by the lines 4 and 5 in FIGURE 1.

The prepared and treated disc is then mounted in a chamber and a mixture of hydrogen and vapor of silicon iodide and including a quantity of boron as an acceptor impurity is introduced thereinto and the chamber heated to decompose the vapor and deposit an epitaxial layer of P-type silicon on the surface of the disc having stacking faults formed therein which originate on the substrate surface at the silicon carbide particles.

The disc with the layer of P-type silicon epitaxially deposited thereon is removed from the chamber and etched for about 1 minute in a solution consisting of 1 part HF, 3 parts $HNO_3$ and 10 parts glacial acetic acid, all of concentrated reagent grade, to make the stacking faults appear more distinctly on the surface of the epitaxially deposited layer.

The etched surface is then examined with a 750× microscope and the length of the longest line of intersection of the stacking faults are measured. The characteristic relationship between this length and the distance to the origin of the stacking fault is then utilized to determine the thickness of the deposited layer of P-type silicon. Since in this example the substrate has a (111) orientation, the characteristic stacking fault intersections are equilateral triangles with all sides parallel to <110> directions and with the apex at the substrate surface. For such an equilateral triangle the distance $d$ from the base to the apex is given by the relationship, $$d=0.816l$$

where $l$ is the length of one side. In this example $l$ is the length of the line of intersection of the stacking fault measured on the surface of the deposited layer and the distance $d$ is, therefore, the thickness of the layer, since the apex of the stacking fault is at the substrate surface.

Measurement of the material of the deposited layer indicates accurate correlation between the true layer thickness and that determined in accordance with the foregoing method.

*Example II*

A disc about 1.0 inch in diameter and about 0.015 inch thick is cut as in Example I from a single crystal of N-type silicon having, within 1°, a (111) crystallographic orientation. The disc is lapped, etched and chemically polished in the manner set forth in Example I to prepare the disc for the epitaxial deposition thereon of the selected layer of material.

After the foregoing preparation the surface of the disc upon which the layer of material is to be epitaxially deposited is scribed in two perpendicularly arranged diameters with a 0.001 inch radius diamond point weighted with about 30 grams. The disc is then mounted in a chamber and a mixture of hydrogen and vapor of silicon iodide and including a quantity of boron as an acceptor impurity is introduced thereinto and the chamber heated to decompose the vapor and deposit on the surface of the disc an epitaxial layer of P-type silicon having stacking faults formed therein which originate at the scribed lines on the surface of the disc.

The disc with the epitaxially deposited layer thereon is removed from the chamber and etched for about 1 minute in a solution consisting of 1 part HF, 3 parts $HNO_3$ and 10 parts glacial acetic acid, all of concentrated reagent grade, to make the lines of intersection of the stacking faults appear more distinctly on the surface of the deposited layer of P-type silicon.

The etched surface is then examined with a 750× microscope and the length of the largest lines of intersection of the stacking faults are measured. The characteristic relationship between this length and the distance to the origin of the stacking fault is utilized to determine the thickness of the deposited layer of material. Again since the substrate has a (111) orientation the thickness $d$ was determined from the relationship, $$d=0.816l$$

since, as in Example I, the characteristic stacking faults for a (111) oriented substrate are equilateral triangles having their apex at the surface of the substrate.

Weight analysis of the material actually deposited on the substrate indicates accurate correlation between the true thickness and the thickness determined in accordance with the foregoing method.

While only certain preferred features of this invention have been shown and illustrated with reference to specific examples, many modifications and changes will occur to those skilled in the art. It is, therefore, to be understood that the appended claims are intended to cover all such changes and modifications as fall within the true spirit and scope of the invention.

What I claim as new and desire to secure by Letters Patent of the United States is:

1. The method of determining the thickness of a layer of an epitaxially deposited material which forms stacking faults in only one set of equivalent crystallographic planes which comprises: artificially producing predetermined surface imperfections for nucleating stacking faults in said epitaxially deposited layer at at least one region of the surface of the substrate upon which said layer is deposited; epitaxially depositing said layer so as to nucleate and grow stacking faults therein, said stacking faults being characteristic of the crystallographic orientation of said substrate; and measuring the length of the line of intersection of the stacking faults appearing on the surface of said epitaxially deposited layer to determine the thickness of said layer by utilizing the characteristic relationship between the length of the line of intersection of said stacking fault to the distance to its origin.

2. The method of determining the thickness of a layer of an epitaxially deposited material which forms stacking faults in only one set of equivalent crystallographic planes which comprises: artificially producing predetermined surface imperfections for nucleating stacking faults at at least one region of the surface of a substrate prior to the epitaxial deposition of said layer of material thereon; epitaxially depositing said layer so as to cause the formation of stacking faults therein which originate at the surface of said substrate; and measuring the length of the line of intersection of the stacking faults appearing on the surface of said epitaxially deposited layer to determine the thickness of said layer by utilizing the relationship between the length of the line of intersection of said stacking fault to the distance from its origin.

3. The method of determining the thickness of a layer of epitaxially deposited material selected from the group consisting of semiconductive materials which form stacking faults on {111} planes which comprises: artificially producing predetermined surface imperfections for nucleating stacking faults at at least one region of the surface of a selected substrate prior to the epitaxial deposition thereon of said layer; epitaxially depositing said layer so as to cause the formation of a single or multiple triangular stacking faults in said layer having an apex at said treated region of the subtrate; and measuring the length of the longest line of intersection of the stacking faults appearing on the surface of said epitaxially deposited layer to determine the thickness of said layer by utilizing the relationship between the length of the line of intersection of said stacking fault to the distance to the apex.

4. The method of measuring the thickness of a layer of epitaxially deposited material which forms stacking faults in only one crystallographic direction which comprises: artificially producing predetermined surface imperfections for nucleating stacking faults at at least one region of the surface of a substrate prior to the epitaxial deposition thereon of said layer by treating said surface with a plurality of nonreactive particles which are small compared to the desired thickness of said layer; epitaxially depositing said layer so as to cause the formation of stacking faults in said layer which nucleate at said nonreactive particles on the surface of said substrate; and measuring the length of the line of intersection of the stacking faults appearing on the surface of said epitaxially deposited layer to determine the thickness of said layer by utilizing the relationship between the length of the line of intersection of said stacking fault to the distance to its origin.

5. The method of determining the thickness of epitaxially deposited layers of materials selected from the group consisting of silicon, germanium and the III–V compound semiconductive materials which comprises: providing a monocrystalline substrate having a (111) crystallographic orientation; artificially producing predetermined surface imperfections for nucleating stacking faults at at least one region of the surface of said substrate prior to the epitaxial deposition thereon of a layer of a selected material; epitaxially depositing said layer so as to cause the formation therein of single or multiple triangular stacking faults having all sides parallel to <110> directions and having an apex at said treated region of the substrate surface; and measuring the length of the line of intersection of the stacking faults appearing on the surface of said epitaxially deposited layer to determine the thickness of said layer by utilizing the characteristic relationship between the measured length of the line of intersection of said stacking faults so formed to the distance to its apex.

6. The method of determining the thickness of epitaxially deposited layers of materials which form stacking faults in only one crystallographic direction which comprises: providing a monocrystalline substrate having a (111) crystallographic orientation; scratching at least one region of the surface of said substrate upon which said layer of material is to be epitaxially deposited to nucleate stacking faults therein originating at said scratched region; epitaxially depositing said layer so as to nucleate and grow stacking faults therein, said stacking faults being of equilateral triangular configuration having all sides parallel with <110> directions and apex at the scratched region of said substrate; and measuring the length of line of intersection of the stacking faults appearing on the surface of said epitaxially deposited layer of material to determine the thickness of said layer by utilizing the characteristic relationship between the length of the line of intersection of said stacking fault to the distance to its origin.

References Cited by the Examiner

UNITED STATES PATENTS 3,041,226   6/1962   Pennington _____ 156—17

OTHER REFERENCES

Light Article in Metallurgy of Semiconductor, AIME, volume 15. Compilation of papers delivered at Metallurgical Society Conference held at Los Angeles, California, Aug. 30 to Sept. 1, 1961, pages 137–158.

"Metallargy of Elemental and Compound Semiconductors" AIME, vol. 12. Compilation of papers delivered at Metallurgical Society Conference held at Boston, Mass., on Aug. 29–31, 1960, pp. 289–294.

DAVID L. RECK, *Primary Examiner.*